G. W. ALBRIGHT.
AUTOMOBILE SIGNALING DEVICE.
APPLICATION FILED MAR. 9, 1917.
1,301,212.
Patented Apr. 22, 1919.
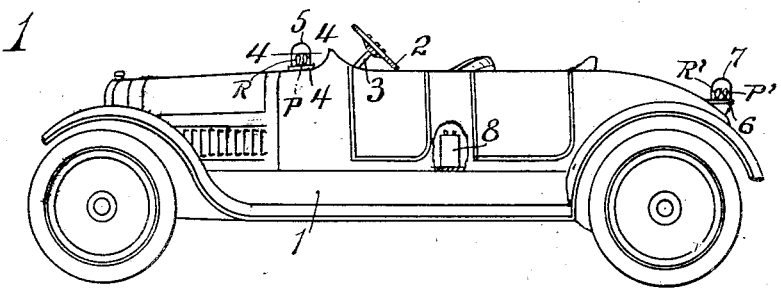
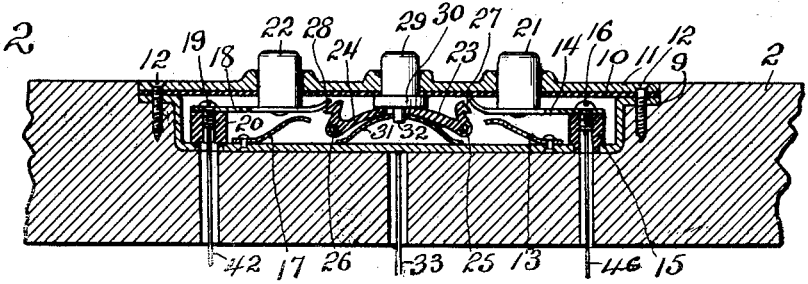
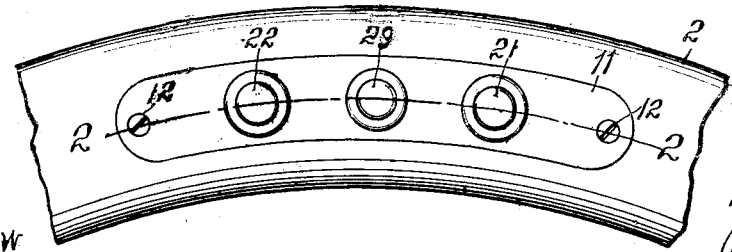
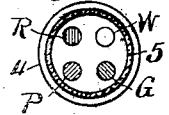
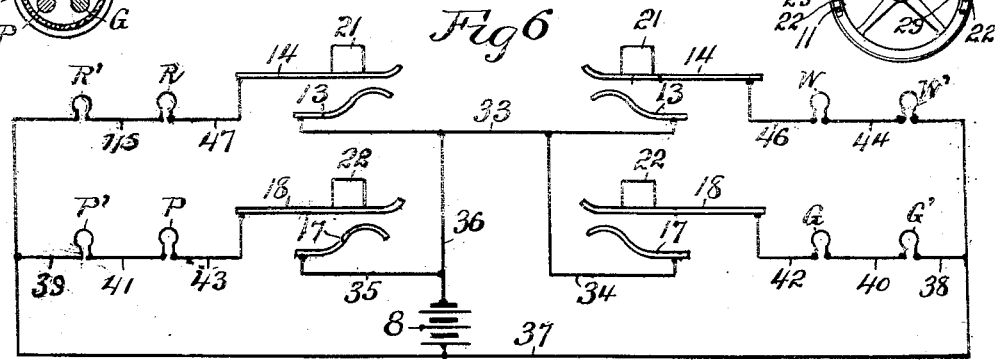
WITNESS:
R. L. Hamilton
INVENTOR.
George W. Albright
BY
Warren D. House
His ATTORNEY

UNITED STATES PATENT OFFICE.

GEORGE W. ALBRIGHT, OF KANSAS CITY, MISSOURI.

AUTOMOBILE SIGNALING DEVICE.

1,301,212.   Specification of Letters Patent.   Patented Apr. 22, 1919.

Application filed March 9, 1917. Serial No. 153,753.

*To all whom it may concern:*

Be it known that I, GEORGE W. ALBRIGHT, a citizen of the United States, residing at Kansas City, in the county of Jackson and State of Missouri, have invented a certain new and useful Improvement in Automobile Signaling Devices, of which the following is a specification.

My invention relates to improvements in automobile signaling devices.

The object of my invention is to provide a novel, simple and efficient signaling device with which an automobile operator may, without removing his hands from the steering wheel, indicate the course he is about to take, whether to the right or left or forward or backward.

My invention provides further controlling devices carried by the steering wheel at the right and left sides thereof respectively, by which the operator may, without removing his hands from the steering wheel, actuate selectively different signals for indicating the course which he is about to take.

My invention provides still further novel manually releasable means for holding the signaling controlling devices carried by the steering wheel in their active positions.

The novel features of my invention are hereinafter fully described and claimed.

In the accompanying drawing which illustrates the preferred embodiment of my invention, Figure 1 is a side elevation, partly broken away, of an automobile provided with my improvement.

Fig. 2 is an enlarged longitudinal sectional view on the line 2—2 of Fig. 3, showing a portion of a steering wheel and one set of circuit closers and parts connected therewith and operable in connection therewith carried thereby.

Fig. 3 is a plan view of what is shown in Fig. 2.

Fig. 4 is an enlarged horizontal section on the line 4—4 of Fig. 1, showing one group of lamps.

Fig. 5 is a plan view, reduced, of a steering wheel provided with my improved circuit closer mechanism.

Fig. 6 is a diagrammatic view of the electric circuit employed in connection with my improvement.

1 designates an automobile body carrying the usual steering wheel 2, mounted on a steering post 3.

On the body 1, forward of the steering wheel 2 is mounted a casing 4 which is provided with a transparent globe 5 which incloses four incandescent electric lamps designated respectively by W, G, R and P, which are preferably respectively white, green, red and purple in color.

A casing 6, similar to the casing 4, is mounted on the body 1 adjacent to the rear end thereof and is provided with a transparent globe 7 which incloses a group of four incandescent lamps designated by W', G', R' and P', which are respectively white, green, red and purple in color.

When lighted, the white lights W and W' may indicate that the automobile operator intends to keep straight ahead. The green lamps G and G' may indicate that he proposes to turn to the right. The red lamps R and R' may indicate that he is going to turn to the left, and the purple lights P and P' may indicate that the operator proposes to back his machine.

The current generating means for furnishing electricity to the lamps may be a battery 8 of any suitable type, carried in a convenient place on the body 1.

Controlling mechanism is mounted on the steering wheel 2 by which the operator may operate any one of the pairs of lamps of the same color independently of the other lamps. This controlling mechanism comprises two sets of controlling devices mounted respectively at opposite sides of the wheel 2, so that the operator may operate one set of devices with the right hand and the other set of devices with the left hand. As these two sets of controlling devices are alike, a description of one set will answer for both, the set chosen for such description being the set on the right side of the steering wheel.

Mounted in a recess provided in the top of the wheel 2 is a curved box 9 having mounted on its top a sheet of insulating material 10, such as vulcanized fiber or hard rubber, the box being provided with a cover 11 which is secured to the box by screws 12 which enter the wheel 2. In the box 9 is a push button circuit closer, consisting of a spring contact plate 13 secured to and in electrical connection with the box 9, and which is adapted to be struck by a spring contact plate 14, which has one end secured to the top of an insulating tube 15 by a screw 16 mounted in the upper end thereof.

Another circuit closer of the push button type is mounted in the box 9 and comprises a spring contact plate 17 secured to the upper side of the bottom of the box 9 and adapted to be struck by a spring contact plate 18 which has one end secured by a screw 19 to the top of an insulating tube 20.

The insulating tubes 15 and 20 have their lower ends rigidly secured respectively in two holes provided in the bottom of the box 9.

Two push buttons 21 and 22 are secured respectively to the upper sides of the spring contact plates 14 and 18 and are vertically movable in holes provided therefor in the cover 11. When the push buttons 21 and 22 are depressed until the plates 14 and 18 respectively strike the plates 13 and 17, the circuit will be closed through these two circuit closers.

For holding the contact plates 14 and 18 releasably in the closed position, I provide a pair of spring actuated catches 23 and 24, which are respectively pivoted on transverse pins 25 and 26, the ends of which are mounted in opposite sides of the box 9. The catches 23 and 24 are provided respectively with hooks 27 and 28, which are adapted to respectively engage and hold the contact plates 14 and 18, when the latter are depressed by the push buttons 21 and 22 so as to contact and have electrical connection with the contact plates 13 and 17.

For swinging the catches 23 and 24 out of engagement with the plates 14 and 18, I provide a push button 29 which is slidably mounted in a vertical hole in the center of the cover 11 and which bears against the upper sides of the catches 23 and 24 intermediate of the pins 25 and 26. The upward movement of the push button 29 is limited by an annular peripheral flange 30 thereon, which is adapted to strike the insulating plate 10.

For normally forcing the catches 23 and 24 and the push button 29 to the normal position, that is, the position in which the catches will engage the contact plates 14 and 18, I provide a bow spring 31, the ends of which rest upon the bottom of the box 9, and the central portion of which bears against the under side of the catches 23 and 24 intermediate of the pins 25 and 26.

The spring 31 is provided with a central hole, through which extends a central projection 32 at the lower end of the push button 29, thus serving to hold the spring 31 in its proper position.

Referring to Fig. 6, 33 designates a conductor which connects the right and left spring contact plates 1, 3 in the boxes 9, and which includes said boxes.

Two conductors 34 and 35 are respectively connected to the right and left contact plates 17, which are respectively mounted in the two boxes 9. The conductor 34 is connected to the conductor 33. The conductor 35 is connected to a conductor 36 which is connected at one end to the conductor 33, and which is connected at its other end to one pole of the battery 8, the other pole of which is connected to a conductor 37, the ends of which are respectively connected to one set of terminals of the lamps W' and R'. Conductors 38 and 39 are connected to the conductor 37 and are respectively connected to one set of terminals of the lamps G' and P', the other set of terminals of which are respectively connected by conductors 40 and 41 to one set of terminals of the lamps G and P, the other set of terminals of which are respectively secured to conductors 42 and 43, which are respectively connected to the right and left contact plates 18.

The other set of terminals of the lamps W' and R' are respectively connected to two conductors 44 and 45, which are respectively connected to one set of terminals of the lamps W and R, the other set of terminals of which are connected to conductors 46 and 47 respectively, which are in turn respectively connected to the right and left contact plates 14.

When the operator desires to signal that his course will be straight-ahead, and desires to indicate this by lighting the white lights W and W', he depresses the right push button 21, upon which the current from the battery 8 will pass by the conductor 36 and the conductor 33 to the right spring contact plate 13, through which the current will pass to and through the right contact plate 14 and thence through conductor 46, lamp W, conductor 44, lamp W' and thence back to the battery 8 through the conductor 37.

If the right push button 22 is depressed to the closed position, the current from the battery 8 will pass by conductors 36, 33 and 34 to the right contact plate 17 and thence back to the battery through the right contact plate 18, conductor 42, lamp G, conductor 40, lamp G', conductor 38 and conductor 37. The green lights G and G' will thus be lighted, indicating that the operator is going to turn to the right.

To indicate that he is going to turn to the left, he depresses the left push button 21, upon which the current will pass from the battery 8 through conductors 36 and 33, left contact plates 13 and 14, conductor 47, lamp R, conductor 45, lamp R' and conductor 37 back to the battery 8.

To indicate that the operator is going to back up, the left push button 22 is depressed, upon which the current will pass from the battery 8 through conductors 36 and 35, left contact plates 17 and 18, conductor 43, lamp P, conductor 41, lamp P', and conductors 39 and 37 back to the battery 8.

The lamps which are lighted will remain so until the operator depresses the proper push button 29. If either the white or green lights W and G are lighted, to discontinue them, he depresses the right push button 29, and he depresses the left push button 29 in order to put out either the red or purple lights.

The wires from the boxes 9 and the screws 16 and 19 of the two sets of controlling devices may be carried from the steering wheel 2 to the steering post 3 and from thence to the lamps and battery as indicated in Fig. 6.

I do not limit my invention to the structure shown and described, as modifications, within the scope of the appended claim, may be made without departing from the spirit of my invention.

What I claim is:—

The combination with two contact members comprising each a spring plate having a push button attached thereto, of two pivoted catches arranged to respectively engage and hold said contact members in the closed position, a push button for simultaneously engaging and swinging said catches to positions in which the contact members will be released, and a spring for forcing said last named push button and said catches to a position in which the catches will be adapted to engage with the contact members when the latter are moved to the closed position.

In testimony whereof I have signed my name to this specification.

GEORGE W. ALBRIGHT.